United States Patent
Tomi (10) Patent No.: US 8,397,033 B2
(45) Date of Patent: Mar. 12, 2013

(54) PARALLEL PROCESSING PROCESSOR SYSTEM

(75) Inventor: Hideyasu Tomi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

(21) Appl. No.: 12/712,128

(22) Filed: Feb. 24, 2010

(65) Prior Publication Data

US 2010/0228920 A1    Sep. 9, 2010

(30) Foreign Application Priority Data

Mar. 4, 2009 (JP) ................................. 2009-051287

(51) Int. Cl.
*G06F 12/00* (2006.01)

(52) U.S. Cl. ........................................................ 711/147

(58) Field of Classification Search ................... None
See application file for complete search history.

(56) References Cited

U.S. PATENT DOCUMENTS

2008/0109637 A1 * 5/2008 Martinez et al. ................. 712/29
2008/0209173 A1 * 8/2008 Evers et al. .................... 712/207

FOREIGN PATENT DOCUMENTS

JP    2006-133839    5/2006

* cited by examiner

*Primary Examiner* — Duc Doan (74) *Attorney, Agent, or Firm* — Fitzpatrick, Cella, Harper & Scinto

(57) ABSTRACT

A parallel processing processor system includes multiple processor elements, a main memory, and a shared memory, whose latency with the processors is less than the latency between the main memory and the processors. Each of the multiple processor elements has a DSP (Digital Signal Processor) and an instruction cache. Firmware executed by the DSPs is transferred from the main memory to the shared memory and is shared by the DSPs. Updating of the instruction caches in the case where a cache miss has occurred is performed by, for example, copying, into the instruction caches, the content of the shared memory corresponding to an address accessed by a DSP.

9 Claims, 11 Drawing Sheets

PARALLEL PROCESSING PROCESSOR SYSTEM

BACKGROUND OF THE INVENTION

1. Field of the Invention

The present invention relates to a parallel processing processor system, provided with multiple processors, that processes data to be processed in parallel using the multiple processors. The present invention particularly relates to a parallel processing processor system capable of reducing inherent instruction cache capacities of each of the processors while also maintaining the degree of performance thereof.

2. Description of the Related Art

In the controllers of MFPs (Multifunction Peripherals), individual hardware logic is provided for processes such as image reading, recording, printing, communication, fax, and so on, thereby realizing functions requested of the MFP. However, preparing circuits for each function makes it difficult to reduce the cost of the controller while also maintaining its functionality.

Reducing costs while maintaining functionality is possible by executing non-simultaneous image processes using programmable hardware. DSPs (Digital Signal Processors), reconfigurable processors, and configurable processors can be given as examples of programmable hardware. Here, reducing costs by switching firmware using multiple DSPs shall be considered as an example.

A configuration in which multiple DSPs that are each assigned to different image processes are connected and a series of multiple types of image processes are executed sequentially on the same image region is called "pipeline architecture". If pipeline architecture is employed, differences in processing times among the DSPs will result in DSPs that act as bottlenecks, making sufficient throughput difficult to achieve.

In order to avoid this problem, the DSPs can be customized so that the processing times of the individual DSPs are equal.

However, if a DSP is customized for a certain process, it is difficult to customize that DSP in the same manner for a different piece of firmware when switching to and executing that different piece of firmware.

Meanwhile, although techniques for regulating loads among the DSPs exist (for example, see Japanese Patent Laid-Open No. 2006-133839), such regulation requires overhead; furthermore, improving the throughput is difficult and the control involved is complex, and thus such a technique is not necessarily desirable. Moreover, pipeline architecture has a problem in that it is difficult to implement a changeable configuration that has scalability, where costs are reduced by reducing the number of DSPs, performance is improved by increasing the number of DSPs, and so on.

Based on this, a data parallel processing architecture, in which the image data to be processed is divided, each piece of image data obtained through the division is assigned to a different DSP, and the multiple processes that were executed by different DSPs in the pipeline architecture are executed by those multiple DSPs, is more preferable than a pipeline architecture. In the present specification, an architecture in which multiple DSPs are used, the image data to be processed is divided, and a series of processes are performed on the pieces of image data obtained through the division in parallel by the DSPs shall be called a data parallel processing architecture.

When a structure in which image data to be processed is divided and data parallel processing is executed thereon by multiple DSPs, the size of the programs executed by the DSPs increases, and thus the cache miss rate is higher than when a pipeline architecture is employed for an instruction cache of the same capacity. When a cache miss occurs, the DSP accesses a main memory. The main memory is a DRAM (Dynamic Random Access Memory) or the like located off of the chip that implements the DSP.

With an off-chip DRAM, 20 to 30 clocks are necessary for a one-word read/write, and thus the latency at the time of the cache miss is extremely high, which greatly influences the processing capabilities of the DSP. Meanwhile, if an instruction cache having a capacity capable of storing all the processes assigned to each DSP is employed, the size of the instruction cache increases, thereby increasing the surface area of the circuit.

A method that uses a secondary cache can be employed in order to reduce the latency at the time of a cache miss. A "secondary cache" is a processor-specific storage device with a higher latency than a primary cache and a lower latency than a DRAM.

Although using a secondary cache can solve the aforementioned problem, doing so also leads to the following problems:

because a cache requires a circuit called a "tag" in addition to a circuit for storing data, the circuit scale increases; and cache transfer is executed in units called "cache lines" and thus the efficiency is poor.

SUMMARY OF THE INVENTION

The present invention solves the above problems by employing a shared memory such as an SRAM (Static Random Access Memory) shared among DSPs rather than needing to employ a secondary cache. With a shared memory, tags are unnecessary, and transfers not executed in cache line units are possible.

The present invention provides, in a structure where data parallel processing is executed by multiple processors, a configuration capable of reducing the capacity of an instruction cache while obtaining the desired degree of performance.

According to one aspect of the present invention, a parallel processing processor system that includes multiple processors and performs parallel processing on data read out from a main memory using the multiple processors is provided. The system comprises multiple processor elements, each processor element including a processor and an instruction cache that holds an instruction corresponding to at least part of a program executed by the processor. The system also comprises a shared memory, whose latency with the processors is less than the latency between the main memory and the processors, that stores the program transferred from the main memory and is shared by the multiple processor elements. The system further comprises an update unit that updates the instruction in the instruction cache with an instruction in the program stored in the shared memory in the case where a cache miss has occurred in the instruction cache.

Further features of the present invention will become apparent from the following description of exemplary embodiments with reference to the attached drawings.

DESCRIPTION OF THE EMBODIMENTS

Various exemplary embodiments, features, and aspects of the present invention will be described in detail below with reference to the drawings.

First Embodiment

Figure 1:
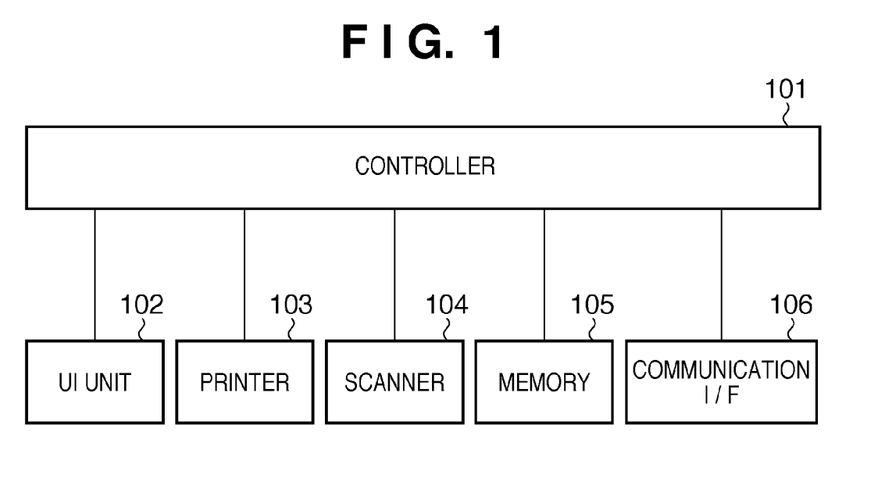
FIG. 1 is a block diagram illustrating the hardware configuration of an image processing apparatus according to an embodiment of the present invention.

FIG. 1 is a block diagram illustrating the hardware configuration of an image processing apparatus including a parallel processing processor system according to the present invention. The image processing apparatus according to the present embodiment is assumed to be an MFP (Multifunction Peripheral) provided with a copy function, a printer function, a fax function, and a scanner function, and is configured so as to include a controller 101, a UI (User Interface) unit 102, a printer 103, a scanner 104, a memory 105, and a communication I/F (interface) 106.

Outlines of these units shall be given hereinafter.

The controller 101 is a unit that controls the image processing apparatus as a whole. The controller 101 is electrically connected to the various blocks, such as the printer 103, the scanner 104, and so on, and performs control so as to realize a high level of functionality. This shall be described in greater detail later.

The UI unit 102 provides a user interface (UI) for a user to operate the image processing apparatus. The UI unit 102 is configured of, for example, a liquid crystal touch panel, and accepts operational instructions for the image processing apparatus from a user, displays previews of images to be printed, and so on.

The printer 103 is a block that prints a visual image onto a recording sheet based on an electrical image signal, and is configured of, for example, a laser printer, an inkjet printer, or the like.

The scanner 104 is a block that optically reads a document image and converts the read image into an electrical image signal.

The memory 105 is an external memory configured of a memory device such as, for example, a DDR-SDRAM, an HDD, or the like. This memory 105 functions as a main memory, and not only temporarily stores image data, but also stores control programs, data, and so on used by the controller 101 to realize the functions of the image processing apparatus.

The communication I/F 106 is a block that exchanges data with an external device, and connects to the Internet or a LAN, connects to a public telephone line to perform fax communication, connects to a PC (Personal Computer) through a USB interface, or the like.

Figure 2:
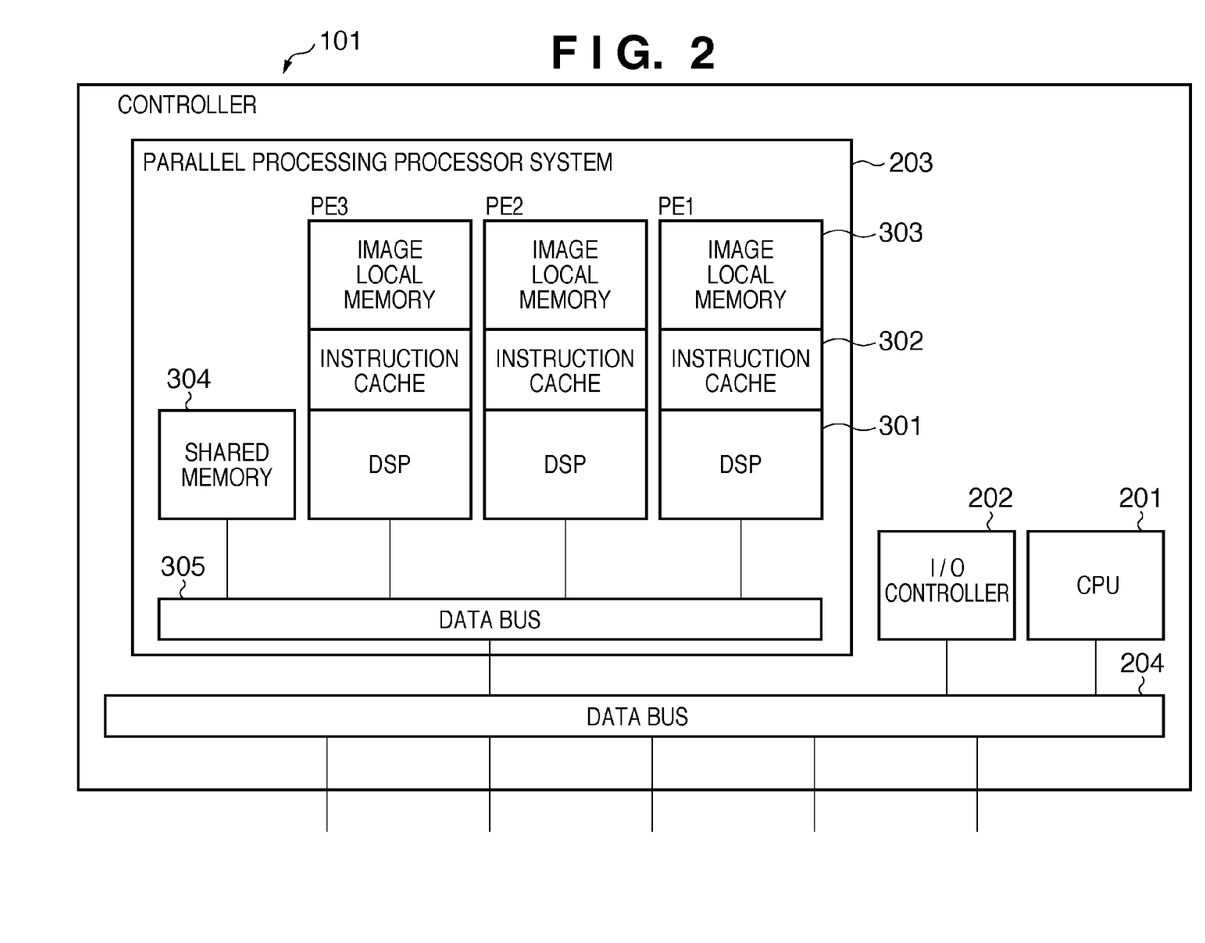
FIG. 2 is a block diagram illustrating an outline of a controller in an image processing apparatus according to a first embodiment.

FIG. 2 is a block diagram illustrating an outline of the controller 101. The controller 101 includes a CPU (Central Processing Unit) 201, an I/O controller 202, a parallel processing processor system 203, and a data bus 204. The I/O controller 202 controls data transfer between the controller 101 and units such as the memory 105 and the communication I/F 106, and has DMA (Direct Memory Access) functionality. In the present embodiment, the configuration is such that a single parallel processing processor system 203 is included in the controller 101, but a configuration in which multiple parallel processing processor systems 203 are included is also possible. The CPU 201, the I/O controller 202, and the parallel processing processor system 203 are connected via the data bus 204.

The parallel processing processor system 203 includes DSPs (Digital Signal Processors) 301, instruction caches 302, image local memories 303, a shared memory 304, and a data bus 305. A single DSP 301, instruction cache 302, and image local memory 303 are collectively called a processor element (PE). Although the configuration of the present embodiment is such that the parallel processing processor system 203 includes three processor elements PE1, PE2, and PE3, the number of processor elements is not limited to three. Furthermore, each DSP 301 in the present embodiment is assumed to have the same processing capabilities.

With the parallel processing processor system 203, each piece of image data obtained through division into predetermined units is stored in the image local memory 303 of a single PE, and that image is processed by the DSP 301 of the same PE according to instructions within the instruction cache of that PE. Firmware, which is program instructions executed by the DSPs 301 of multiple PEs, is stored in the shared memory 304. An advantage of storing instructions rather than data in the shared memory 304 is that write accesses from the DSPs 301 do not occur, reducing the likelihood of access concentration. Access concentration occurring in the shared memory 304 creates a bottleneck, leading to a drop in the processing capabilities. The shared memory 304 has a lower latency with the DSPs 301 than the memory 105 and has a high operational frequency, and thus the DSPs 301 are capable of reading out the firmware at high speeds.

When switching firmware, the I/O controller 202 DMA-transfers firmware stored in the memory 105 to the shared memory 304. The DSPs 301 are connected to the shared memory 304 via the data bus 305.

With the image processing apparatus according to the present embodiment, the parallel processing processor system 203 carries out read image processing, recorded image processing, communication image processing, and so on.

"Read image processing" refers to executing shading correction or the like on image data received from the scanner 104, and also performing various types of image processes, such as MTF correction, color conversion processing, filter processing, gamma processing, and so on, on that image data.

"Recorded image processing" refers to performing binarization processing, halftone processing, and color conversion processing such as RGB to CMYK conversion on image data that has undergone the aforementioned read image processing, thereby converting that image data into a halftone image. Furthermore, this processing involves performing various types of image processes such as resolution conversion based on the recording resolution, image magnification, smoothing, darkness correction, and so on, thereby converting the image data into high-resolution image data, and outputting that data to a laser printer or the like.

"Communication image processing" refers to performing resolution conversion, color conversion, and so on a read image in accordance with communication capabilities, performing resolution conversion on an image received through communication in accordance with recording capabilities, and so on. In the present embodiment, for example, the size of the firmware for read image processing/recorded image processing is assumed to be less than 16 KB, whereas the capacity of the shared memory 304 is assumed to be 16 KB. Meanwhile, the capacity of the instruction cache 302 is assumed to be 4 KB. The instruction cache 302 need only be capable of holding at least some of the instructions of the program executed by the DSP 301, and therefore the capacity of the instruction cache 302 may be significantly smaller than the overall size of the program.

Figure 3:
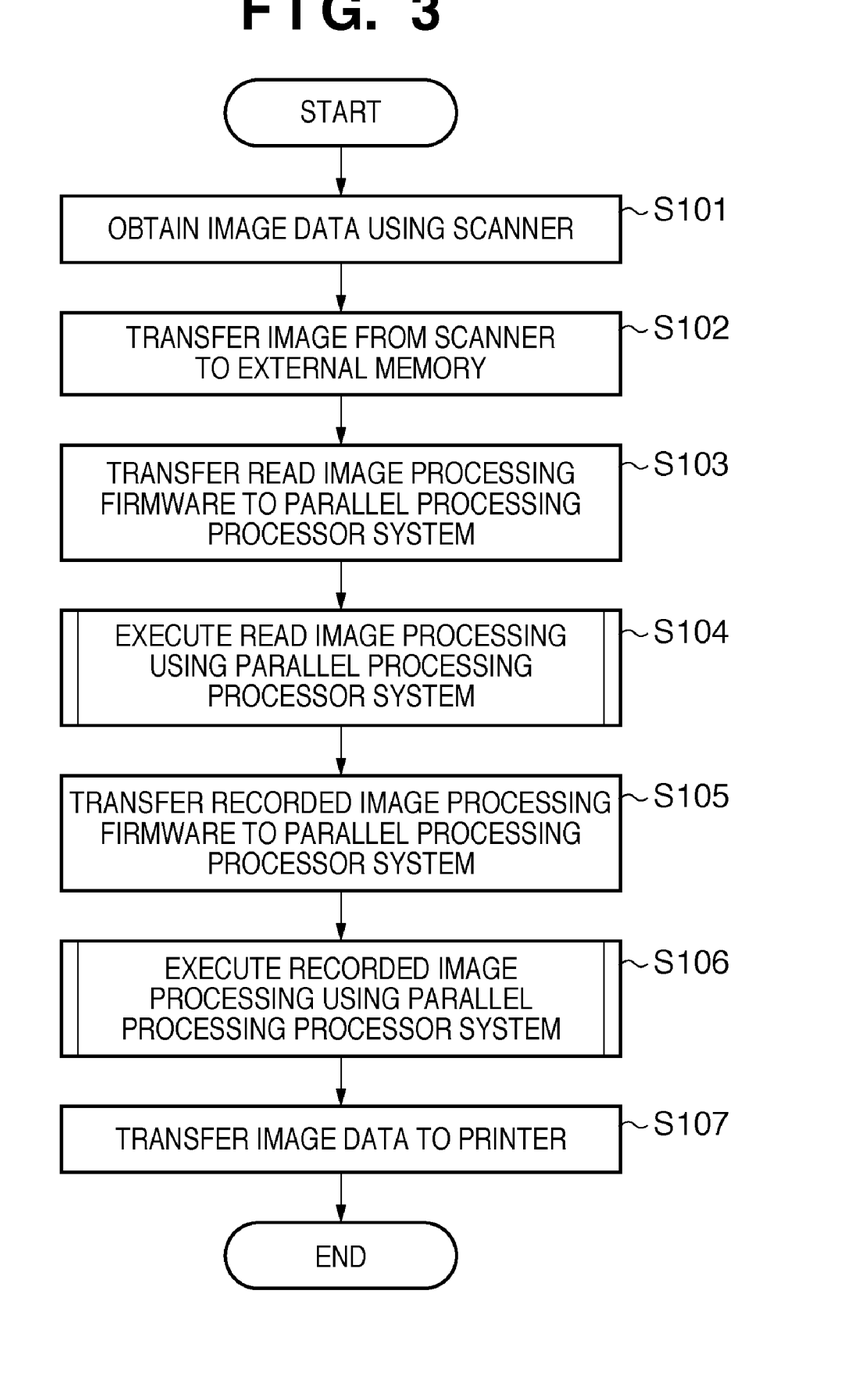
FIG. 3 is a flowchart illustrating an example of operations performed by the image processing apparatus according to the first embodiment.

FIG. 3 is a flowchart illustrating operations performed by the image processing apparatus according to the present embodiment. In the present embodiment, detailed descriptions shall be given regarding operations of the parallel processing processor system 203 during processing spanning from image data being obtained through the scanner 104 to the image data being outputted to the printer 103.

First, image data is obtained through the scanner 104 (S101), and that image data is then transferred to the memory 105 (S102).

Next, read image processing firmware is transferred to the parallel processing processor system 203 of the controller 101 (S103), and the read image processing is executed by the parallel processing processor system 203 (S104).

Furthermore, recorded image processing firmware is transferred to the parallel processing processor system 203 (S105), and the recorded image processing is executed by the parallel processing processor system 203 (S106).

Finally, the image data is transferred to the printer 103 via the data bus 204 (S107). Detailed descriptions regarding S104 and S106 shall be given later. In S103 and S105, the image processing firmware is transferred to the shared memory 304 by, for example, the I/O controller 202.

Figure 4:
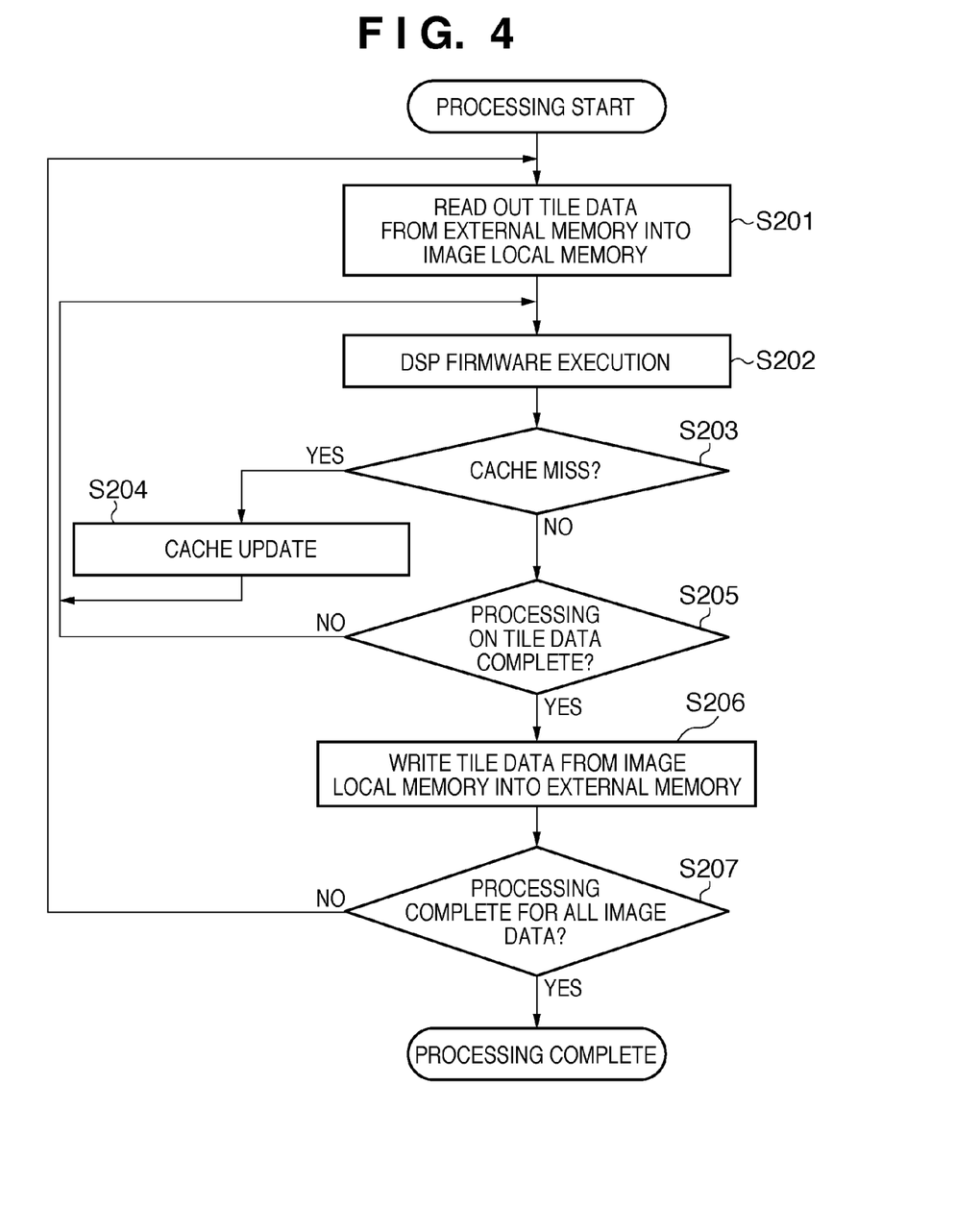
FIG. 4 is a flowchart illustrating an example of operations performed by a parallel processing processor system according to the first embodiment.

The operations of the parallel processing processor system 203 in S104 and S106 shall be described using the flowchart in FIG. 4. Although FIG. 4 illustrates the operations of a single DSP 301, all of the DSPs 301 present in the parallel processing processor system 203 execute the same processes in parallel.

When the processing commences, the DSP 301 reads out image data of a predetermined size to be processed from the memory 105 (called "tile data" hereinafter) and stores that data in the image local memory 303 (S201).

Next, the DSP 301 executes the firmware (S202), and it is determined whether or not a cache miss has occurred in the instruction cache 302 (S203). In the case where a cache miss has occurred, that an instruction in the instruction cache 302 is updated with another instruction in a program stored in the shared memory 304 (S204). To be more specific, the stated update is carried out by copying into the instruction cache 302, the content of the shared memory 304 corresponding to the address that the DSP 301 accessed.

As described earlier, when a cache miss occurs in the conventional configuration, the DSP 301 accesses the memory 105, which is the main memory and is located off the chip. As opposed to this, in the present embodiment, the instruction cache is updated by accessing the shared memory 304, which has a lower latency with the DSP than the memory 105, which is the main memory located off the chip. For this reason, the present embodiment is superior to the conventional technique with respect to processing speed.

If a cache miss has not occurred, it is determined whether or not all of the image processes have been executed on the tile data (S205).

If in S205 all of the image processes have not been completed, the procedure returns to S202, and the execution of the firmware by the DSP 301 is continued. However, if all of the image processes have been completed, the processed tile data is written back into the memory 105 from the image local memory 303 (S206).

Next, it is determined whether or not processing has been completed for all of the image data (S207). If the processing has not been completed, the procedure returns to S201, where the next piece of tile data is read out from the memory 105 and stored in the image local memory 303, whereas if the processing has been completed, the overall procedure ends.

Figure 5:
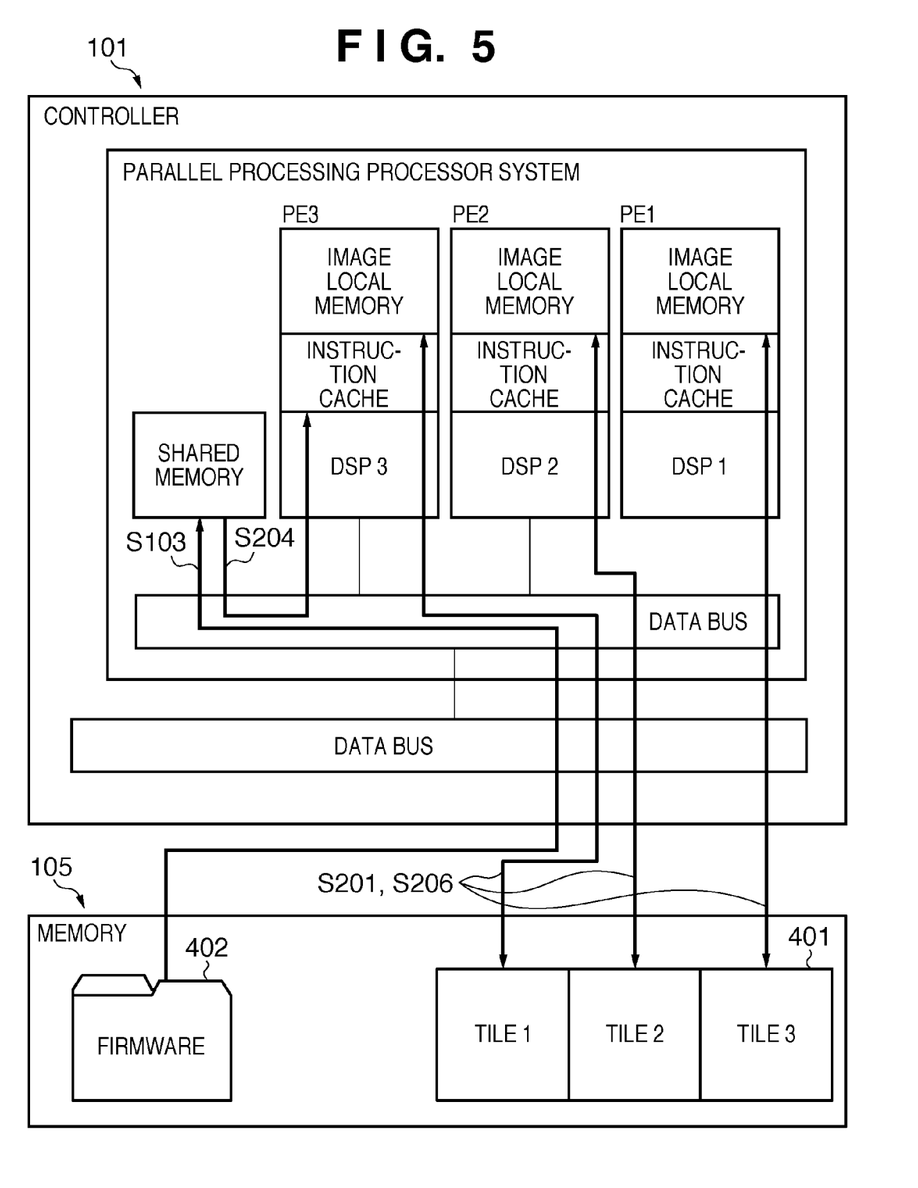
FIG. 5 is a conceptual diagram illustrating a tile data/firmware data flow according to the first embodiment.

FIG. 5 illustrates a conceptual diagram of the tile data/firmware data flow based on the flowchart in FIG. 4.

Image data 401 and firmware 402 are stored in the memory 105. The image data 401 is divided into tiles 1, 2, and 3, which are processed by DSPs 3, 2, and 1, respectively. In FIG. 5, the step numbers added to the arrows correspond to the step numbers in the flowcharts in FIG. 3 and FIG. 4.

Figure 6:
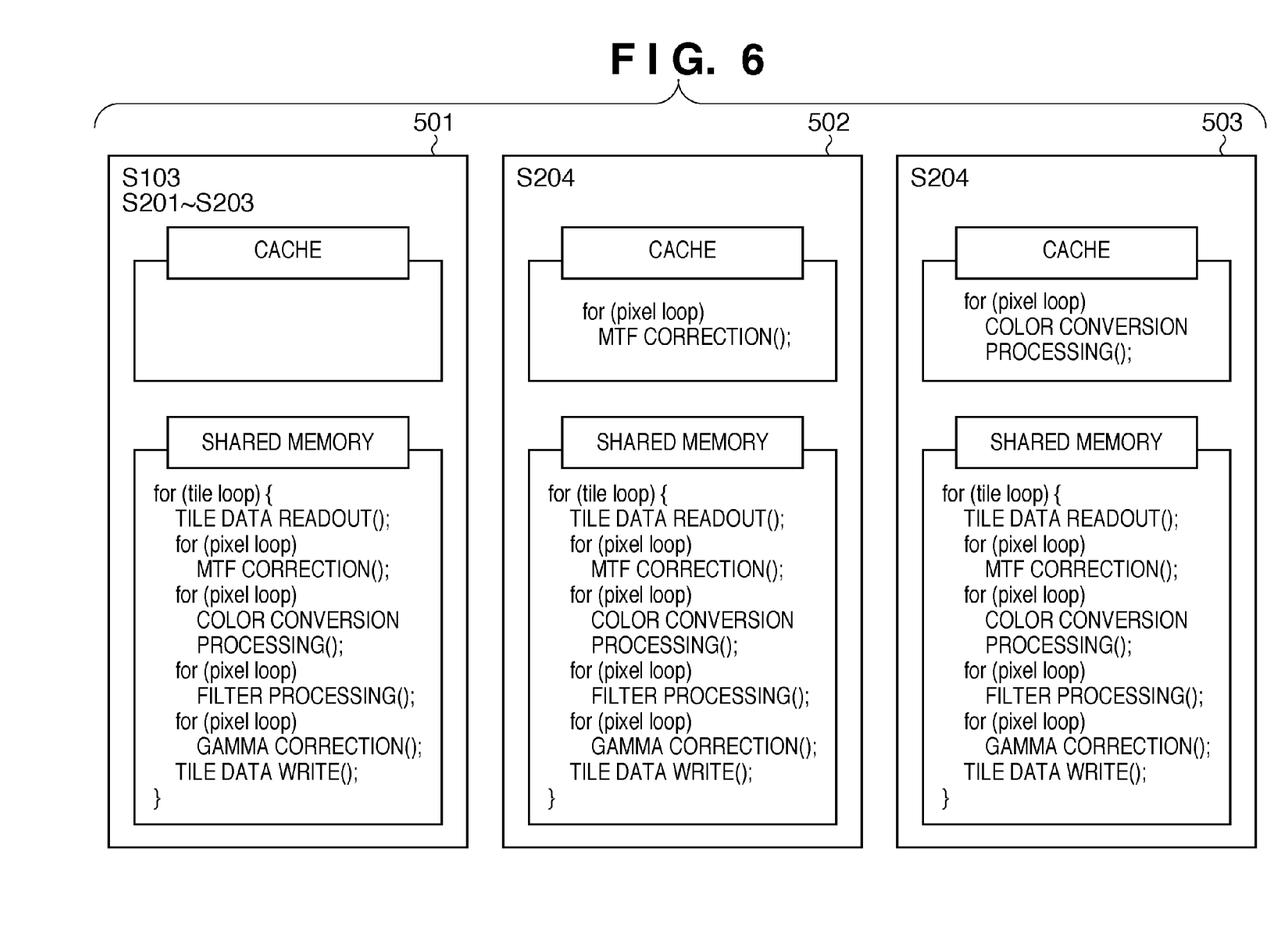
FIG. 6 is a conceptual diagram illustrating movement of the content of a shared memory/instruction cache according to the first embodiment.

The movement of the content of the shared memory/instruction cache occurring during the processing in the present embodiment shall be described using the flow occurring during the read image processing as an example. FIG. 6 is a conceptual diagram illustrating this.

With the parallel processing processor system 203, the tile data is first stored in the image local memory 303, after which various types of image processes performed at the pixel level are carried out on all of the pixels in the tile data. The following is carried out on all of the image data.

First, the read image processing firmware is transferred (S103) to the shared memory 304 (501).

When the DSP 301 commences execution of the firmware (S202), the read image processing firmware is not stored in the instruction cache 302, and thus a cache miss occurs (S203). At this time, part of the firmware stored in the shared memory 304 (an MTF correction processing function) is copied (S204) to the instruction cache 302 (502).

No cache misses occur during the period in which the MTF correction process is being carried out on all the pixels within the tile data. However, when the MTF correction process has been completed for all of the pixels in the tile data, a cache miss occurs, and a color conversion processing function, which is a different part of the firmware stored in the shared memory 304, is copied into the instruction cache 302 (503). This is repeated until the gamma correction processing is completed, and when the gamma correction processing has been completed, the processed tile data is written back into the memory 105.

If the processing has not been carried out on all of the image data, the next tile data is read out and stored in the image local memory 303, and the processing continues.

The latency of the shared memory 304 shall now be described.

In the case where the memory 105 is provided with the DDR-SDRAM as the main memory, the latency depends on the latency of the data bus 204, the latency of the DDR-SDRAM, and so on, and 20 to 30 clocks are necessary for a one-word read/write. However, if the shared memory 304 is disposed so as to have several clocks' worth of latency from the DSP 301, the latency of the time of a cache miss can be reduced to approximately one fifth.

Accordingly, through the above processing, the capacity of the instruction cache can be reduced while obtaining the desired degree of performance in a structure where the image data to be processed is processed in parallel by multiple DSPs.

Second Embodiment

Hereinafter, a second embodiment of the present invention shall be described in detail with reference to the appended drawings.

The hardware configuration of an image processing apparatus according to the present embodiment is the same as that shown in FIG. 1. Furthermore, the configuration of the controller 101 is basically the same as that shown in FIG. 2.

Figure 7:
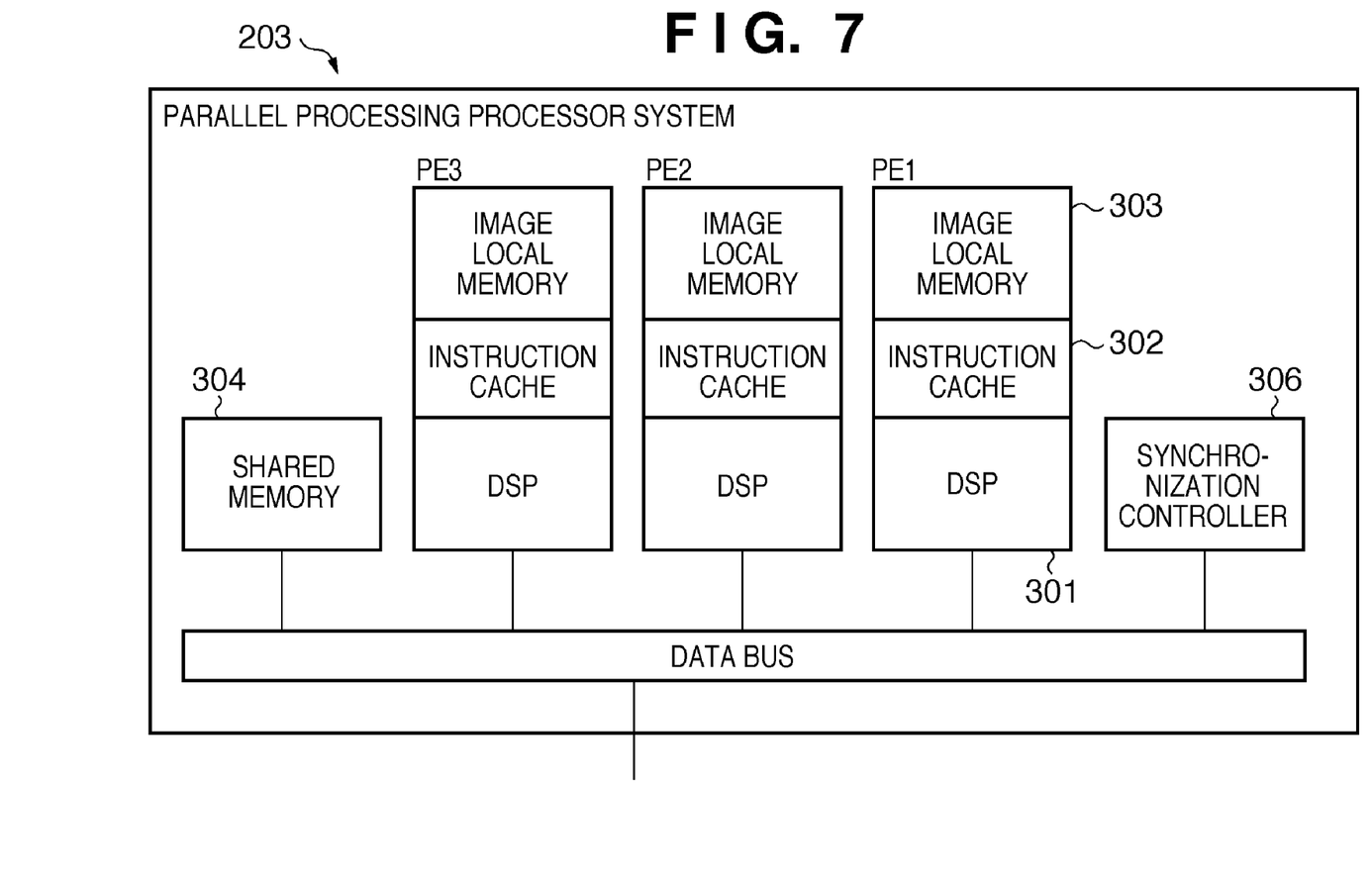
FIG. 7 is a block diagram illustrating an outline of a controller in an image processing apparatus according to a second embodiment.

FIG. 7 is a block diagram illustrating an outline of a parallel processing processor system 203 according to the present embodiment. In FIG. 7, constituent elements that are the same as those shown in FIG. 2 are given the same reference numerals. As illustrated in FIG. 7, the parallel processing processor system according to the present embodiment is configured so as to further include a synchronization controller 306 that controls synchronization between the DSPs. In the present embodiment, an interrupt signal from a DSP is used as a synchronizing signal.

Upon receiving a synchronizing signal from a DSP 301, the synchronization controller 306 instructs, for example, the I/O controller 202 to rewrite the firmware in the shared memory 304. In the present embodiment, the size of the firmware for read image processing/recorded image processing is assumed to be no less than 8 KB and less than 16 KB, whereas the capacity of the shared memory 304 is assumed to be 8 KB. Meanwhile, the capacity of the instruction cache 302 is assumed to be 4 KB.

Figure 8:
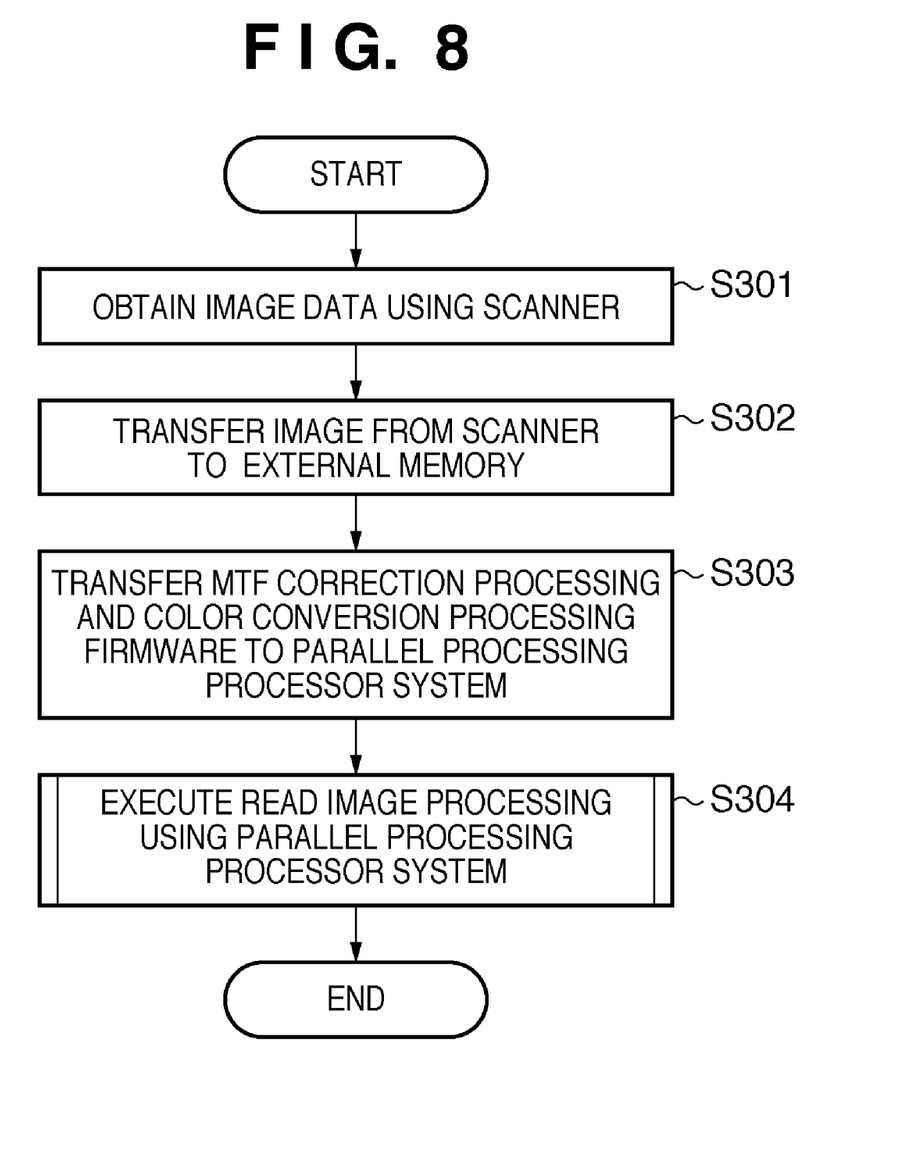
FIG. 8 is a flowchart illustrating an example of operations performed by the image processing apparatus according to the second embodiment.

FIG. 8 is a flowchart illustrating operations performed by the image processing apparatus according to the present embodiment. Here, detailed descriptions shall be given regarding operations of the parallel processing processor system during processing spanning from image data being obtained through the scanner 104 to the read image processing being performed.

First, image data is obtained through the scanner 104 (S301), and that image data is then transferred to the memory 105 (S302).

Next, of the read image processing firmware, the MTF correction processing function and the color conversion processing function are transferred to the parallel processing processor system 203 (S303), and the read image processing is performed by the parallel processing processor system 203 (S304).

Detailed descriptions shall be given later regarding S304. In S303, the image processing firmware is transferred to the shared memory 304 by the I/O controller 202.

Figure 9:
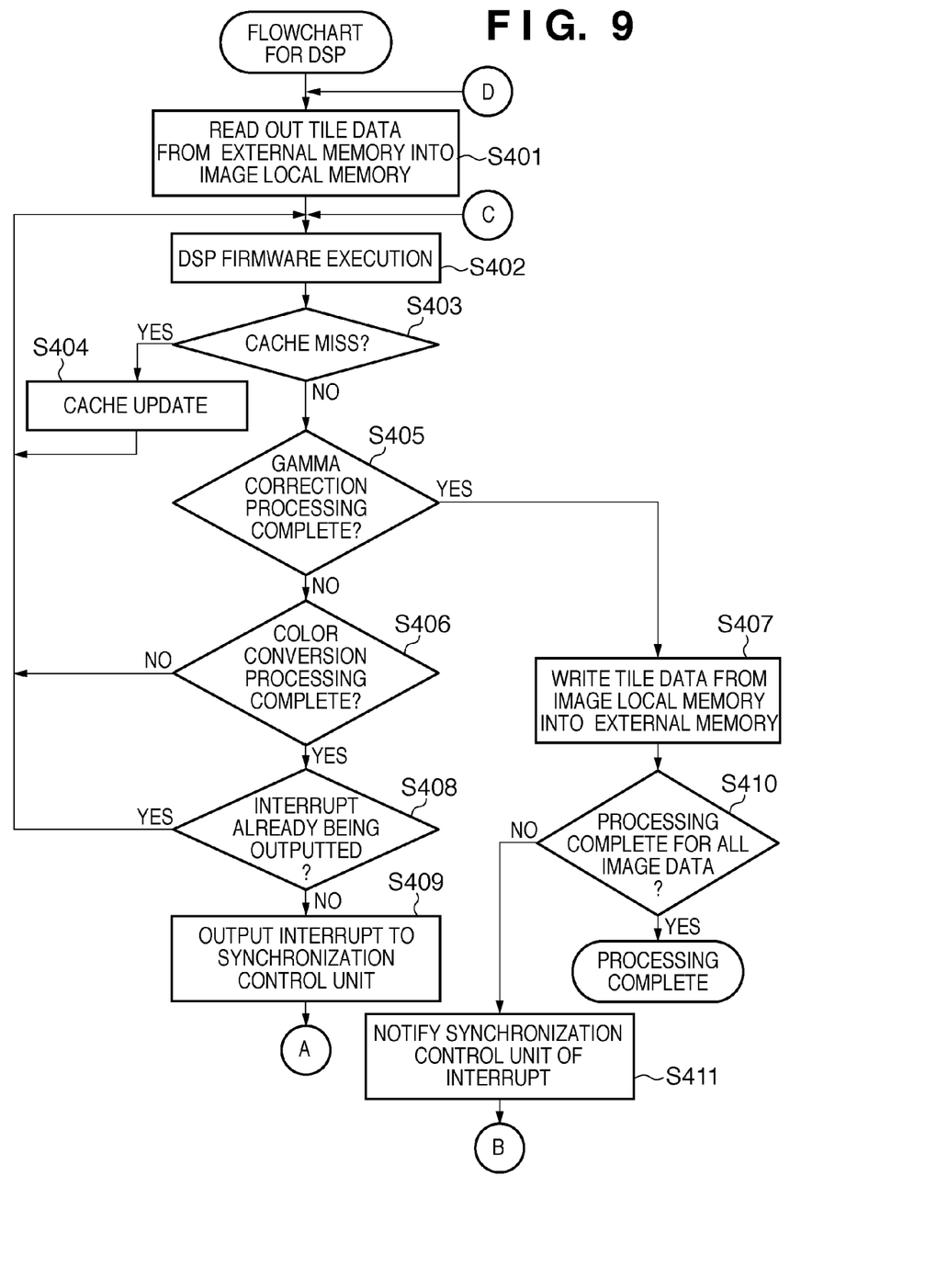
FIG. 9 is a flowchart illustrating an example of operations performed by a parallel processing processor system according to the second embodiment.
Figure 10:
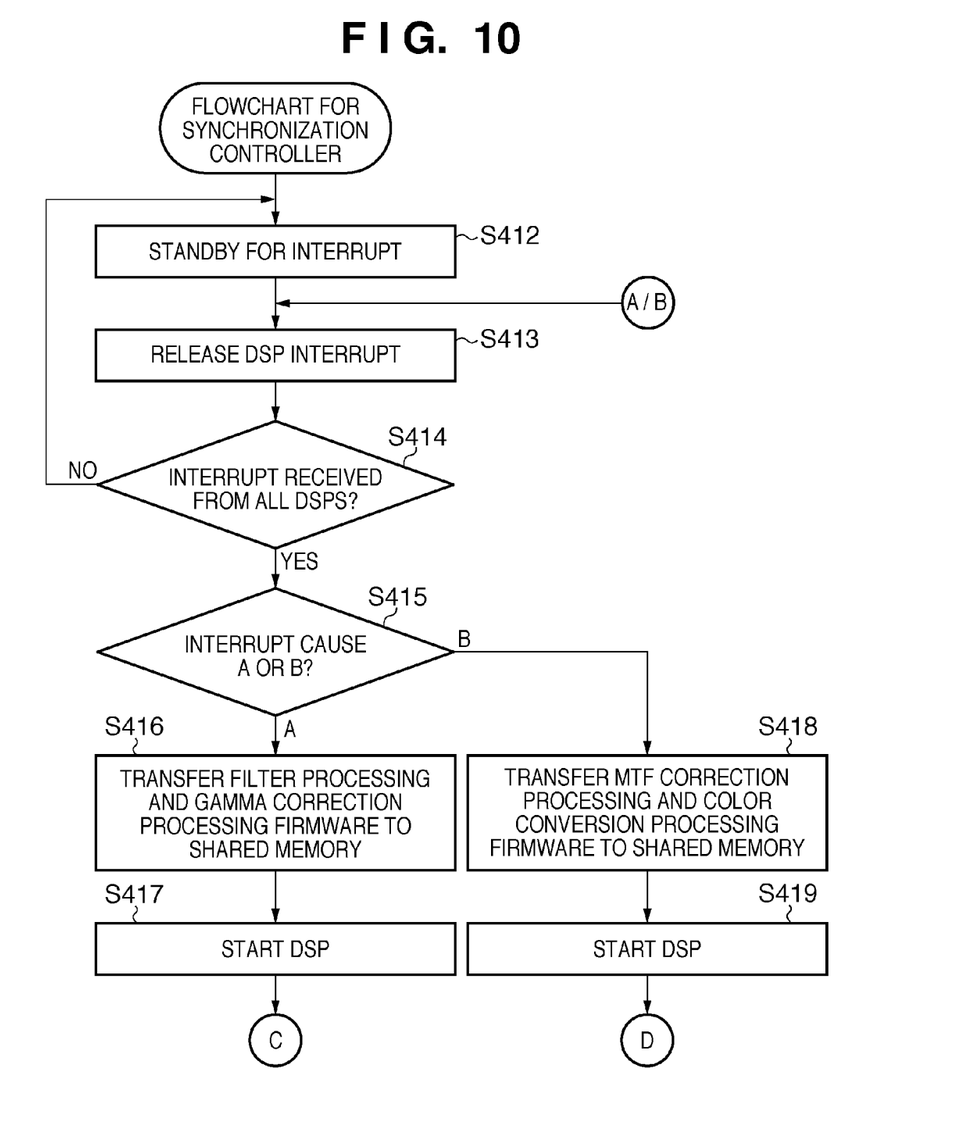
FIG. 10 is a flowchart illustrating an example of operations performed by a parallel processing processor system according to the second embodiment.

FIGS. 9 and 10 are flowcharts illustrating operations performed by the parallel processing processor system 203 according to the present embodiment. FIG. 9 is a flowchart illustrating processes performed by the DSP 301, whereas FIG. 10 is a flowchart illustrating processes performed by the synchronization controller 306.

First, FIG. 9 shall be described. With the read image processing performed by the DSPs 301, it is assumed that MTF correction processing, color conversion processing, filter processing, and gamma correction processing are performed in that order on each piece of tile data. Because the size of the image processing firmware as a whole exceeds the capacity of the shared memory 304, it cannot be stored therein in its entirety. For this reason, the MTF correction processing function and the color conversion processing function are stored in the shared memory 304 at a certain point in time, and the DSPs 301 execute the MTF correction processing and the color conversion processing. Then, at a different point in time, the filter processing function and the gamma correction processing function are stored in the shared memory 304, and the DSPs 301 execute the filter processing and the gamma correction processing.

When the processing commences, the tile data is read out from the memory 105 and stored in the image local memory 303 (S401).

Next, the DSP 301 executes the firmware (S402), and it is determined whether or not a cache miss has occurred (S403). In the case where a cache miss has occurred, the instruction cache 302 is updated (S404). At this time, the instruction cache update is realized by copying, into the instruction cache, the content of a region in the shared memory 304 that corresponds to the address accessed by the DSP 301. If a cache miss has not occurred, it is determined whether or not the gamma correction processing has ended (S405). If the gamma correction processing has not ended, it is determined whether or not the color conversion processing has ended (S406).

If in S405 the gamma correction processing has ended, the series of read image processes has ended for the current tile data, and therefore the processed tile data is written back into the memory 105 from the image local memory 303 (S407). If in S406 the color conversion processing has not ended, the procedure returns to S402, where the DSP 301 continues with the execution of the current firmware, whereas if the color conversion processing has ended, it is determined whether or not an interrupt is already being outputted (S408).

If in S408 an interrupt is being outputted, the procedure returns to S402, where the DSP 301 continues with the execution of the firmware, whereas if an interrupt is not being outputted, an interrupt is outputted to the synchronization controller 306 (S409). After this, the control shifts to the synchronization controller 306 (A), and the DSP enters a standby state.

In S407, after the tile data is written back into the memory 105 from the image local memory 303, it is determined whether or not the processing has been completed for all of the image data (S410). If in S410 the processing has been completed for all of the image data, the overall process is complete, whereas if the processing has not been completed, an interrupt is outputted to the synchronization controller 306 (S411), the control shifts to the synchronization controller 306 (B), and the DSP enters a standby state.

Next, FIG. 10 shall be described.

When the processing commences, the synchronization controller 306 enters an interrupt standby state (S412). Having been notified of an interrupt through the aforementioned A or B, the synchronization controller 306 releases the interrupt of the DSP 301 (S413).

Next, it is determined whether or not interrupts have been received from all the DSPs (S414); if interrupts have not been received from all the DSPs, the synchronization controller 306 returns to the interrupt standby state, whereas if interrupts have been received from all the DSPs, it is determined whether the interrupt cause is A or B (S415). Once interrupts have been received from all the DSPs, the processing by the firmware currently stored in the shared memory 304 is completed for all the DSPs, and thus the processing has been synchronized. Accordingly, in order to carry out the next processing, new firmware is transferred to the shared memory 304, and the content thereof is rewritten.

If in S415 the interrupt cause is A, the series of processing for a single piece of tile data has progressed as far as the completion of the color conversion processing, and thus it is necessary to proceed to the filter processing and gamma correction processing for that piece of tile data. Accordingly, in response to this, the synchronization controller 306 requests the I/O controller 202 to transfer the filtering processing and gamma correction processing firmware to the shared memory 304. In response to this request, the I/O controller 202 transfers the filter processing and gamma correction processing firmware to the shared memory 304 (S416), starts the DSP 301 (S417), and transfers control to the DSP 301 (C).

On the other hand, if in S415 the interrupt cause is B, the series of processing for a single piece of tile data has been completed in its entirety, and thus it is necessary to perform the MTF correction processing and color conversion processing on a new piece of tile data. Accordingly, the MTF correction processing and color conversion processing firmware is transferred to the shared memory 304 (S418), the DSP 301 is started (S419), and control is transferred to the DSP 301 (D).

The DSP 301 started based on C resumes processing from the execution of the newly-transferred filter processing and gamma correction processing firmware (S402) on the same piece of tile data. Meanwhile, the DSP 301 started based on D resumes processing from the process for reading out a new piece of tile data from the memory 105 and storing that piece of tile data in the image local memory 303 (S401). The newly-transferred MTF correction processing and color conversion processing firmware is then executed on that new piece of tile data (S402).

Figure 11:
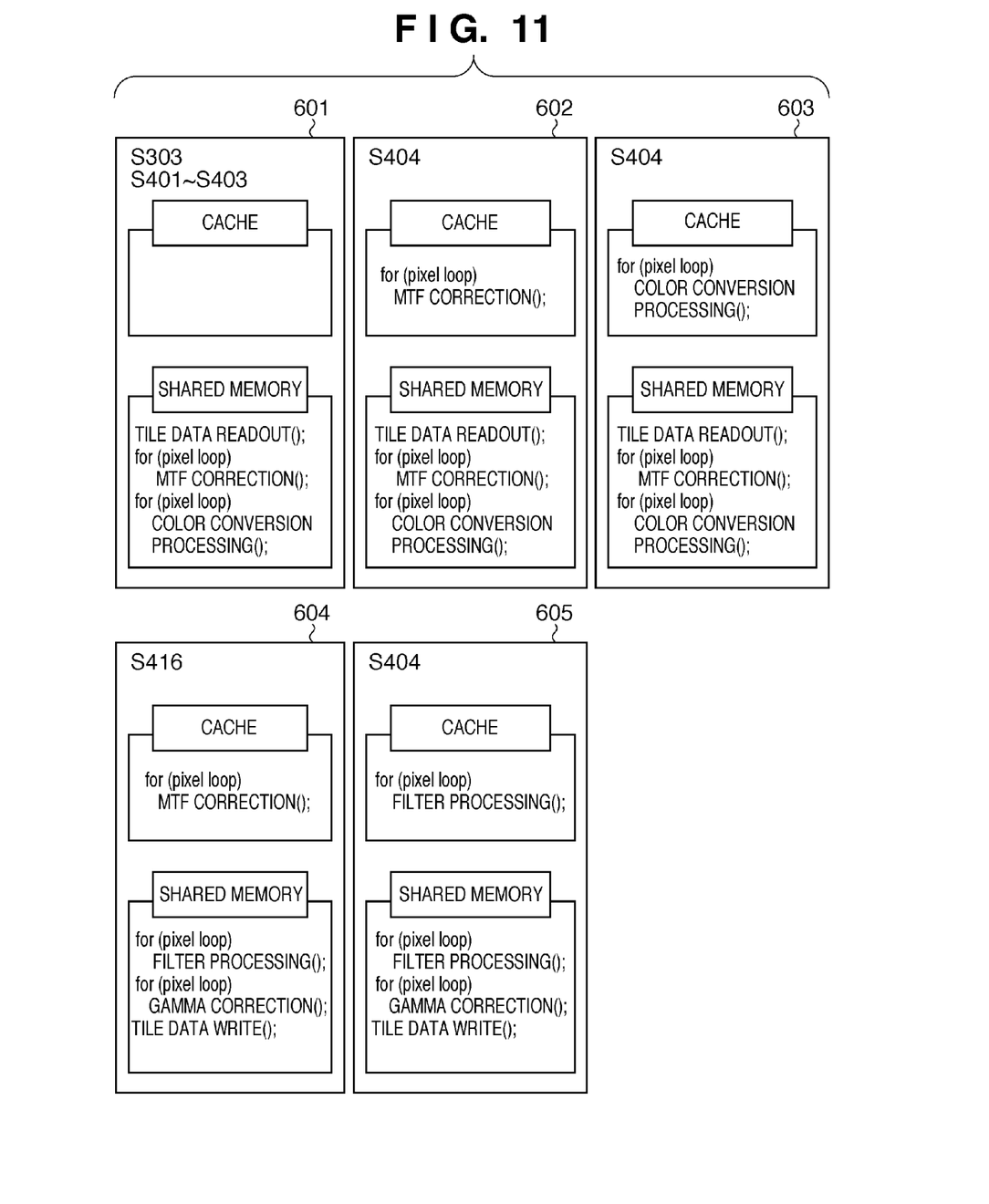
FIG. 11 is a conceptual diagram illustrating movement of the content of a shared memory/instruction cache according to the second embodiment.

The movement of the content of the shared memory/instruction cache occurring during the processing in the present embodiment shall be described next. FIG. 11 is a conceptual diagram illustrating this.

With the parallel processing processor system 203, the tile data is first read out into the image local memory 303, after which various types of image processes performed at the pixel level are carried out on all of the pixels in the tile data. The following is carried out on all of the image data.

First, the MTF correction processing function and color conversion processing function of the read image processing firmware is transferred (S303) to the shared memory 304 (601).

When the DSP 301 commences the execution of the firmware (S402), the firmware for the MTF correction processing function and the color conversion processing function is not stored in the instruction cache 302, and thus a cache miss occurs (S403). At this time, part of the firmware stored in the shared memory 304 (the MTF correction processing function) is copied (S404) to the instruction cache 302 (602).

No cache misses occur during the period in which the MTF correction process is being carried out on all the pixels within the tile data. When the MTF correction processing is completed for all the pixels within the tile data, a cache miss occurs, and the color conversion processing function is copied from the shared memory 304 to the instruction cache 302 (603).

When the color conversion processing ends, the filter processing and gamma correction processing firmware is transferred by the synchronization controller 306 to the shared memory 304 (S416), and as a result, the shared memory/cache are as indicated by 604.

When the DSP 301 resumes execution of the firmware (S402), the filter processing and gamma correction processing firmware is not stored in the cache, and thus a cache miss occurs (S403). At this time, part of the firmware stored in the shared memory 304 (the filter processing function) is copied (S404) to the instruction cache 302 (605).

This is repeated until the gamma correction processing is completed, and when the gamma correction processing has been completed, the processed tile data is written back into the memory 105.

If the processing has not been carried out on all of the image data, the next tile data is read out and stored in the image local memory 303, and the processing continues.

In a configuration in which image data to be processed is divided into predetermined units and parallel processing is executed thereon by multiple DSPs, providing a synchronization controller makes it possible to achieve a desired degree of performance while reducing the capacity of an instruction cache even in the case where the entirety of the firmware is not stored in the shared memory, by performing the processing described thus far.

The present invention is not limited to the aforementioned embodiments. For example, the data to be processed is not limited to image data, and the present invention can also be applied to audio data or the like.

As another embodiment, when there is a gap between the processing capabilities of the DSPs, the processing can be accelerated by preferentially assigning tile data to DSPs that have a higher processing speed.

As yet another embodiment, in the case where synchronization control is performed among the DSPs and there is also a gap between the processing capabilities of the DSPs, the processing time can be made uniform by changing the size of the tile data in accordance with the processing speeds of the DSPs.

Finally, as yet another embodiment, a configuration in which an image local memory is not provided and the DSPs execute processing on images stored in a memory is also possible.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-051287, filed Mar. 4, 2009, which is hereby incorporated by reference herein in its entirety.

What is claimed is:

1. A parallel processing processor system that includes multiple processors and performs parallel processing on data read out from a main memory using the multiple processors, the system comprising:

multiple processor elements, each processor element including a processor and an instruction cache that holds an instruction corresponding to at least part of a program executed by the processor;

a shared memory, whose latency with the processors is less than the latency between the main memory and the processors, that stores the program transferred from the main memory and is shared by the multiple processor elements;

an update unit that updates the instruction in the instruction cache with an instruction in the program stored in the shared memory in the case where a cache miss has occurred in the instruction cache;

a transfer control unit that controls transfers between the main memory and the shared memory; and a synchronization control unit that, in the case where the entirety of the program cannot be stored in the shared memory, requests the transfer control unit to rewrite the program in the shared memory in response to a synchronizing signal outputted by the processor.

2. The parallel processing processor system according to claim 1, wherein the capacity of the instruction cache is smaller than the capacity of the shared memory.

3. The parallel processing processor system according to claim 1, wherein in the case where the cache miss has occurred in the instruction cache, the update unit performs the update by copying, into the instruction cache, the content of the shared memory corresponding to an address that the processor accessed.

4. The parallel processing processor system according to claim 1, wherein each of the multiple processors outputs the synchronizing signal upon completing the execution of the program currently stored in the shared memory, and the synchronization control unit requests the program in the shared memory to be rewritten in response to the synchronizing signal being outputted by all of the multiple processors.

5. The parallel processing processor system according to claim 1, wherein each of the multiple processor elements further include a local memory that stores data to be processed read out from the main memory.

6. The parallel processing processor system according to claim 1, wherein the shared memory operates in a higher frequency than the main memory.

7. The parallel processing processor system according to claim 1, wherein the transfer control unit transfers the program from the main memory to the shared memory in Direct Memory Access (DMA).

8. The parallel processing processor system according to claim 1, wherein at least one of the processors executes at least one of shading correction, MTF correction, color conversion processing, filter processing, and gamma processing on the data.

9. The parallel processing processor system according to claim 1, wherein at least one of the processors executes at least one of binarization processing, halftone processing, color conversion processing, resolution conversion, smoothing, and darkness correction on the data.

\* \* \* \* \*